Oct. 16, 1962 P. SIMONART 3,058,833
METHOD OF PASTEURIZING
Filed Nov. 27, 1959
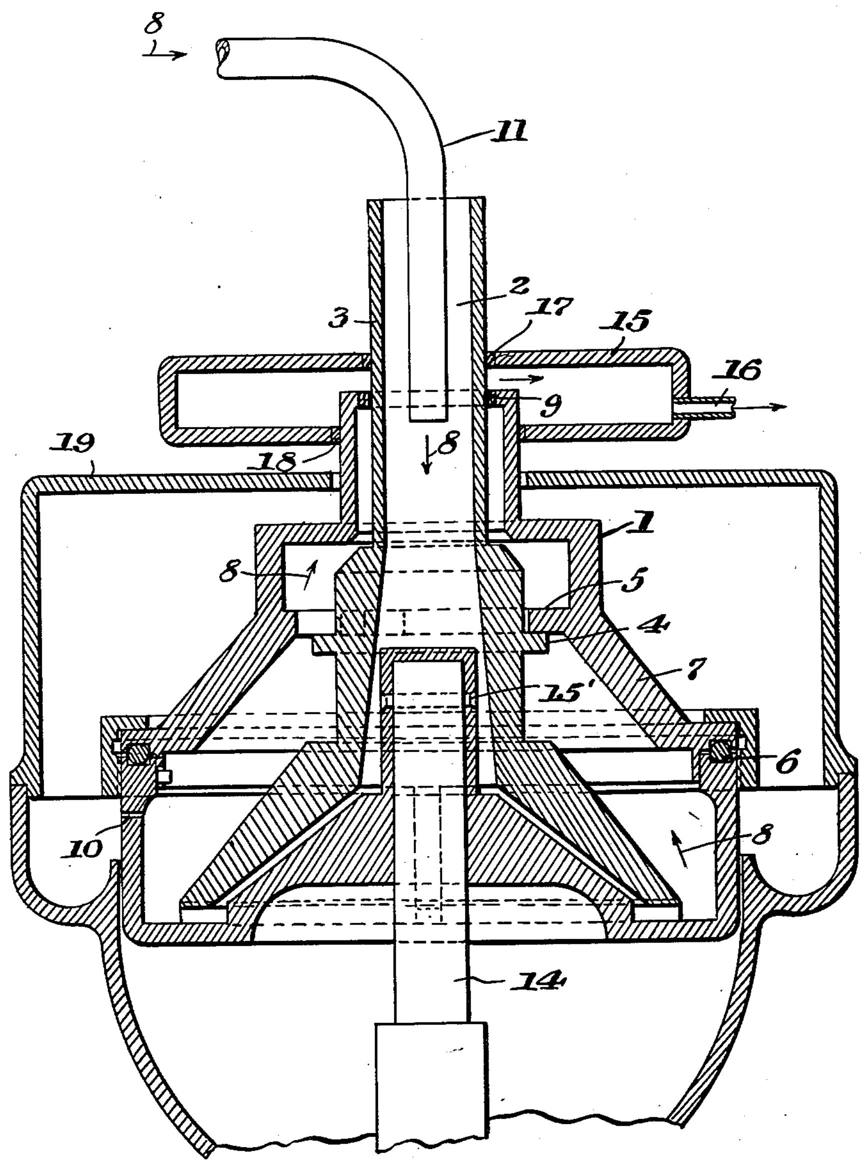
INVENTOR.
Paul Simonart,
BY
Wenderoth, Lind & Ponack
ATTYS.

United States Patent Office 3,058,833

Patented Oct. 16, 1962

1

3,058,833
METHOD OF PASTEURIZING

Paul Simonart, 74 Haachtstraat, Veltem-Beisem, Belgium

Filed Nov. 27, 1959, Ser. No. 855,583
Claims priority, application Luxembourg, Mar. 17, 1954
3 Claims. (Cl. 99—212)

This application is a continuation-in-part of my applications Serial No. 493,436, filed March 10, 1955, and Serial No. 667,697, filed June 24, 1957.

This invention relates to a process and apparatus for removing microscopic particles which are heavier than the liquid and is designed particularly for eliminating the greater portion of the bacteria contained in milk or similar liquids when subjected to centrifuging.

From both the economic and the hygienic viewpoint it is advisable to subject milk to a treatment which destroys all or most of the bacteria contained therein. Generally milk is subjected to sterilization or pasteurization. When milk is treated by heating, a disadvantage is that the destroyed bacteria remain in the treated liquid. It is actually a destruction and not an elimination of the bacteria. A further disadvantage from the heating treatment is that the milk with too great a number of bacteria must be treated under thermal conditions which are detrimental to the colour and taste qualities therein. It is an object of the invention to avoid the above disadvantages.

It is known that bacteria may be partially removed from milk by centrifuging but commercial success has never before been attained by this method. The principal object of this invention is to provide a successful method of sterilizing milk by centrifuging and to explain the reason for past failures of this method.

From tests in the laboratory with small through-put, an unforeseen and unexpected result has become apparent namely, the fast reduction of the separating power during centrifuging. Tests run at speeds giving a centrifugal force of 20,000 and 14,000 *g* (gravity) showed that there is a good elimination of bacteria during the first few minutes of rotation but that such is not the case after a longer period such as 20 or 30 minutes or sometimes even less. This notable decrease in the separating power in centrifuges which is unexpected and unforeseen is illustrated in the following examples which relate to a preheated milk subjected to a centrifugal force of 14,308 *g* (gravity).

| Preheating temperature in degrees Celsius | Number of bacteria in the preheated milk in thousands per ml. | Percentage of bacteria remaining in the centrifuged milk after setting the centrifuging apparatus in motion after— | | |
|---|---|---|---|---|
| | | 2 min. | 10 min. | 30 min. |
| 66 | 3,600 | 6.6 | 23.0 | 53.8 |
| 66 | 1,550 | 8.3 | 33.6 | 96.7 |
| 68 | 3,500 | 2.8 | 3.9 | 35.7 |
| 69 | 640 | 2.8 | 14.0 | 29.5 |
| 70 | 1,100 | 2.9 | 9.4 | 51.8 |
| 70 | 2,200 | 2.4 | 6.5 | 32.7 |
| 71 | 630 | 2.0 | 8.0 | 55.5 |
| 71 | 260 | 4.6 | 15.0 | 58.4 |
| 71 | 220 | 2.5 | 26.3 | 44.5 |
| 71 | 780 | 3.9 | 10.6 | 57.6 |

In order to maintain a substantially constant high percentage of eliminated bacteria during the centrifuging as is essential for commercial acceptance the inventor has discovered that this is obtained by using a centrifugal purifying apparatus whose bowl is provided with an opening for changing or modifying the normal circuit of the liquid treated and not for the purpose of eliminating the liquid or the centrifuged deposit. The amazing influence of such a small opening may probably be explained by the stoppage of unfavorable turbulence phenomena which occur in the usual bowl and such turbulence is prevented by a radial current caused by the suction created by such a small opening. At the start of centrifuging this unfavorable turbulence does not occur and this is probably because it is compensated by the electrostatic forces of the metal wall and the bacteria adhering thereto. Then when the metal wall is covered by a layer of the centrifuged deposits such forces do not intervene any more.

2

An object of the invention, therefore, is to effect the centrifuging in a centrifugal purifying apparatus whose rotor is provided with at least one opening for changing the normal circuit of the liquid being treated, the opening being too small to remove a substantial percentage of such liquid or the centrifuged deposits.

A further object of the invention is to provide a centrifugal purifying apparatus wherein the rotor is provided with at least one opening or aperture for changing the normal circuit of the liquid being treated and such opening or aperture may constitute an incomplete tightness of the rotor sealing joint or a hole in the wall of the rotor.

It is known that the microbial composition of crude milks and similar liquids that they undergo an adequate treatment which gives them every guarantee from the hygienic standpoint while simultaneously ameliorating their technical commercial and economic qualities.

It is for such a purpose that pasteurizing and sterilizing of the milk are universally applied and it is also for this purpose that the bacterial centrifuging of the milk has been suggested recently. This last treatment, while substantially improving the microbiological qualities of the treated milk, must however still be completed by a thermal treatment process either by pasteurizing or by sterilizing, so as to insure a total freedom from pathogens as well as a satisfactory keeping.

The milk which has undergone the bacterial centrifuging and then pasteurizing has qualities which are clearly better than the same milk which has only undergone pasteurizing. In the same way, sterilization is made with more certainty for such milks than for the milks which have not undergone bacterial centrifuging. However, the combination of pasteurizing or sterilizing on one hand, with bacterial centrifuging on the other hand, requires theoretically two succeeding operations in two separate apparatus. Thus, theoretically, the addition to the technique of the bacterial centrifuging did require up to now an additional operation complicating the industrial work.

This invention has notably for its purpose to eliminate this drawback, to simplify the industrial technique and to improve the effectiveness of the bacterial centrifuging.

With the above and other objects in view which will appear from the detailed description below which is given by way of a non-limitative example, reference is made to the accompanying drawing.

The FIGURE is a schematic view mainly in section of the rotor of a centrifugal purifying apparatus positioned within its casing.

The milk to be treated is supplied through the stationary conduit 11 of small size and flows into the channel 2 of the rotating conduit 3.

The rotor 1 is secured to the rotating shaft 14 by means of the pin 15'. The conduit 3 is provided with a ring 4 which is applied against the projections 5 provided inside the cover 7. The cover 7 is attached to the rotor 1 and a sealing joint 6 is provided between the cover 7 and the rotor 1. The path of the liquid is indicated by the arrows 8 and the liquid is finally evacuated through the openings 9 provided in the upper part of the cover 7 to a stationary receptacle 15 having an outlet 16. The receptacle 15 is sealed by means of the sealing joint 17 at the top thereof from the conduit 3 and by means of the sealing joint 18 at the bottom thereof from the upper portion of the cover 7. A casing of the usual type 19 surrounds the rotating rotor and is supported in any desired manner from a stationary frame.

In the drawing therefore the stationary elements are the conduits 11, the receptacle 15, and the casing 19. All of the other elements constitute the rotating rotor and rotate due to the motion given thereto by the shaft 14 rotated from any power source.

In order to maintain the separating power at a constant value the rotor 1 is provided in its vertical wall with an opening 10. My experiments have been run with hole sizes of .3 and .4 mm. By using one hole of .4 mm. size the relative loss with a constant throughput of 5000 liters per hour is 1½ whereas the relative loss with two holes of .4 mm. size is 3%. A throughput of 5000 liters or more per hour is commercial and 3% is an acceptable loss. A smaller hole size down to .1 mm. may be used in order to cut the relative loss so long as the hole does not clog. The throughput is related to the speed of centrifuging, as will be explained.

The following examples illustrate the constancy of the separating power obtained by using a centrifugal apparatus with an output of 180 liters per hour, the bowl of which was provided with an opening of 0.35 mm. diameter. The centrifugal force applied was 12,242 gravity.

| Preheating temperature in degrees Celsius | Number of bacteria in the preheated milk in thousands per ml. | Percentage of bacteria remaining in the centrifuged milk after setting the centrifuging apparatus into motion after— | | | | |
|---|---|---|---|---|---|---|
| | | 2 min. | 10 min. | 20 min. | 30 min. | 50 min. |
| 75 | 17 | 2.9 | 2.6 | 3.5 | 4.1 | 3.2 |
| 75 | 22 | 2.4 | 2.4 | 2.8 | 3.9 | 5.5 |
| 75 | 550 | 2.1 | 2.8 | 2.6 | 3.6 | 3.9 |
| 70 | 42 | 2.3 | 1.9 | 4.3 | 7.1 | 5.4 |
| 70 | 100 | 1.2 | 0.7 | 1.0 | 2.2 | 3.2 |
| 70 | 160 | 2.3 | 2.9 | 3.9 | 2.8 | 4.2 |
| 70 | 165 | 5.5 | 4.1 | 4.6 | 5.9 | 5.4 |
| 70 | 12 | 6.3 | 6.8 | 4.7 | 8.1 | 7.5 |

After the ability to obtain the substantial constancy of effect was established with small scale runs of the order of 200 liters per hour and was shown to be due to the provision of the bleed hole, the next step was to determine the proper speed at which the centrifuge could be operated. It was found that while laboratory tests involving short elements of time and small quantities of milk indicated that a centrifugal force up to 20,000 *g* was feasible, it became quickly evident under commercial conditions that the centrifugal forces exceeding 10,000 *g* were not feasible. The reasons were that, with a throughput of 5,000 liters per hour or more, the metal of which the bowls are made would not stand greater pressures and furthermore the character of the milk changes so that it is no longer milk. Thereafter, after further tests all runs were made at 8,000 to 10,000 *g* and this range of pressures is, therefore, preferred.

In order to illustrate the effect of the hole on the constancy of the bacteria elimination in this preferred range, the following table shows the effect with and without the use of the hole, all other conditions being the same.

| | Rotor without hole, percent bacteria eliminated | Rotor with 2 holes of .4 mm., percent bacteria eliminated |
|---|---|---|
| After 30′ running | 97.8 | 98.3 |
| After 60′ running | 92.3 | 98.1 |
| After 120′ running | 87.4 | 97.8 |
| After 150′ running | 61.2 | 98.2 |

It should be noted that the temperature importantly affects the viscosity. Best results were obtained between 68° and 75° Celsius.

It is to be noticed that the centrifugal purifying apparatus will actually be part of an equipment effecting also the pasteurization or sterilization of milk or similar liquid. If the milk is subjected to pasteurizing, it may be centrifuged at the pasteurizing temperature. If, however, the milk is sterilized, the centrifuging precedes the sterilizing. The centrifuging may be effected in combination with the manufacturing of condensed milk, milk powder, cheese or other by-products.

Experiments have been carried out in order to examine the effectiveness of the method for removal of milk bacteria. With these experiments it was intended to prove the influence of the small opening or openings which are drilled into the wall of a centrifugal container, which are important for the industrial application of the process.

The tests were accomplished under the following conditions:

Centrifuge: Make, Alfa-Laval, hourly output 90 liters.
Speed of rotation: 15,000 per minute, therefore about 12,000 gravity.
Milk: Raw milk, heavily mixed, not made homogeneous, pre-warming temperature 63° C.
Sample taken: Immediately before and after the centrifuging at aspetic conditions.
Counting of the bacteria cells: According to the Breed method.
Counting of the bacteria colony: American Standard Method.

The table below shows, for example, the results which were obtained with a container which was provided with an opening of 0.35 mm. diameter (bored container), as well as those results which were obtained with a container which was not bored.

From each of the containers milk specimens were withdrawn two minutes after starting the centrifuge and then after 10, 20, 30 and 50 minutes.

*Bored Container*

| Sample taken after— | Number of bacteria colonies per ml. | |
|---|---|---|
| | Before centrifuging | After centrifuging |
| 2 minutes | 2,480×10³ | 204×10³ (8.2)* |
| 10 minutes | 4,300 | 318 (7.4) |
| 20 minutes | 4,800 | 301 (6.3) |
| 30 minutes | 5,200 | 390 (7.5) |
| 50 minutes | 5,400 | 600 (11.1) |

| Sample taken after— | Number of bacteria cells per ml. | |
|---|---|---|
| | Before centrifuging | After centrifuging |
| 2 minutes | 29,315×10³ | 2,736×10³ (9.3)* |
| 10 minutes | 32,630 | 2,405 (7.3) |
| 20 minutes | 35,570 | 2,561 (6.8) |
| 30 minutes | 38,090 | 1,950 (5.1) |
| 50 minutes | 38,350 | 3,282 (8.5) |

*Closed Container*

| Sample taken after— | Number of bacteria colonies per ml. | |
|---|---|---|
| | Before centrifuging | After centrifuging |
| 2 minutes | 2,020×10³ | 91×10³ (4.5)* |
| 10 minutes | 1,730 | 176 (10.2) |
| 20 minutes | 1,680 | 830 (49.4) |
| 30 minutes | 2,080 | 850 (40.9) |
| 50 minutes | 1,760 | 650 (36.9) |

See footnote at end of table.

| Sample taken after— | Number of bacteria cells per ml. | |
|---|---|---|
| | Before centrifuging | After centrifuging |
| 2 minutes | 13,975×10³ | 1,176×10³ (8.4)* |
| 10 minutes | 17,030 | 1,560 (9.1) |
| 20 minutes | 16,900 | 13,520 (80.0) |
| 30 minutes | 19,695 | 12,220 (62.0) |
| 50 minutes | 18,720 | 12,220 (62.2) |

* Expressed in percentage of the quantitative relationship of the milk before centrifuging.

The experiments show on one hand that the majority of the milk bacteria can be removed in a constant way by the centrifugal force, if one uses a container which is provided with an opening of 0.35 mm. in diameter. On the other hand they show that one can obtain these results with a non-drilled container only during a very short time of about 10 minutes. The relative opening, accordingly, avoids the retrogression of the separating force (separating capability) which is indispensable for the industrial utilization of the process.

In fact, one can apply two methods to count bacteria in milk: first, count the bacterial cells under the microscope and second count the bacterial colonies developed after incubation on a solid substrate (medium). In the first method one counts dead as well as living cells, in the second method one counts only viable cells which develop on the medium used. The figures given concern cell counts and hence exclude the killing effect of temperature.

With regard to the length of time required in the centrifuge, a given fraction of milk remains in the centrifuge bowl only a certain number of seconds. If, for instance 5,400 liters are pumped per hour through the centrifuge (capacity of the centrifuge) and the content (inside volume) of the bowl is 15 liters, it means, theoretically, that the bowl will be refilled 5,400:15=360 times an hour. This means that theoretically each fraction of milk remains in the bowl 3,600 (seconds/hour):360=10 seconds. The longer the milk remains in the bowl the better the separating effect but the smaller the capacity of the machine.

The purpose of the small hole in the wall of the rotor is to keep constant the separating power when the centrifuge has been running a certain time. In fact, without the hole in the wall of the bowl the separating power slackens already after the centrifuge has been running for 15–20 minutes for semi-industrial experiments. The industrial application needs, of course, a continuous process for 3–5 hours, and that is why the small hole is necessary.

The temperature range for heating the milk may be within the range of 60 to 80° Celsius but the range 68 to 75° Celsius is preferred.

The above apparatus is particularly applicable for separating microscopic particles from a liquid, especially for eliminating bacteria from milk, according to which this liquid is continuously heated and is afterwards fed to the centrifugal clarifying apparatus where the microscopic particles are eliminated.

For eliminating the additional operation required up to now with bacterial centrifuging therefore, the liquid is heated to a temperature suitable for killing microbes and it is fed immediately afterwards to the centrifugal clarifying apparatus where it is treated without changing the temperature and for such a time that the thermal treatment is completed before the liquid has left the clarifying apparatus.

In one method, the liquid is heated to a pasteurizing temperature and it is fed immediately afterwards to the centrifugal clarifying apparatus where it is treated without changing the temperature and for such a time that the liquid is effectively pasteurized before leaving the clarifying apparatus.

In a modification thereof, the liquid is heated to a sterilizing temperature and it is fed immediately afterwards to the centrifugal clarifying apparatus where it is treated without changing the temperature and for such a time that the liquid is effectively sterilized before leaving the clarifying apparatus.

In a particular embodiment, the liquid is treated in the centrifugal clarifying apparatus with a centrifugal force which is at the most around 10,000 gravity.

The thermal process which the milk must undergo is essentially combined with the bacterial centrifuging, that is the milk is pasteurized or sterilized at the same time it undergoes bacterial centrifuging. This supposes that the duration of the liquid present in the centrifuging rotor is controlled adequately in terms of the applied centrifugal force and of the heating temperature. Indeed, it is not enough that the centrifugal force be large enough and that the heating temperature be high enough; it is moreover necessary that the duration of centrifuging meets the requirements both from pasteurizing or sterilizing and from a sufficient elimination of the bacteria.

The combination has been put through tests which have shown that the results obtained are better than those obtained by the separate use of the bacterial centrifuging and the usual heatings for removing microbes. It is thus, for example, that for pasteurized milk, the amount of living and dead bacteria cells is less. The results therefrom are an increase in the keeping ability, a better microbial purity, as well as better tasting qualities, and this with a milder heating than the one currently used.

By way of example, the comparative results obtained for the various treatments of the same milk are set forth below. The numbers give the amount of bacteria colonies obtained for 1 ml. of milk, while the bracketed numbers give the results in terms of percentages of the amount of the bacteria present in crude milk.

| Crude milk | Pasteurized milk | Milk centrifuged at 70° C. | Milk centrifuged at 70° C. and then pasteurized at 80° C. | Milk having undergone centrifugal pasteurizing at 78° C. (16″) |
|---|---|---|---|---|
| 186,000 | 1,570(0.84) | 1,480(0.79) | 240(0.13) | 140(0.075) |

It is notably noticed that in the milk having undergone the centrifugal pasteurizing according to the invention, the amount of living germs is less than in the milk having undergone pasteurizing after centrifuging.

A better quality of the treated product and a simplification of the industrial technique are the main advantages offered by the centrifugal pasteurizing and centrifugal sterilizing according to the invention over the step by step use of the bacterial centrifuging and of pasteurizing or sterilizing.

It is thus, for example, that while this invention finds its main use for the treatment of the milk, it may also be used for any other liquid such as beer, fruit juice, wine, oil, etc.

While such a centrifugal purifying apparatus and method is of particular application for the treatment of milk and similar liquids, it is however to be noticed that other applications are not excluded. By similar liquids, it is meant here, skim milk, partially skimmed milk, milk cream, milk enriched with fatty materials, as well as any mixture of said products, homogenized or not, with one another or with the milk.

In runs carried out up to the present time use has never been made of more than two openings and as a general rule use has only been made of a single opening. But the bacteria are not evacuated through such opening since they remain in the sludge of the centrifuge which remains adhering to an interior wall of the bowl.

It must be understood that the invention is in no way limited to the embodiments described above and that many variations may be brought therein, especially as to the shape, the number, the arrangement and the construction of the elements as well as in the steps of the methods without departing from the spirit and scope of this invention.

I claim:

1. The method of pasteurizing and eliminating bacteria from milk comprising feeding a continuous flow of milk through a centrifugal rotor, rotating said rotor at a speed to subject said milk to a centrifugal force between 8,000 and 10,000 *g*, bleeding the centrifugal rotating mass radially of its direction of rotation at a rate not exceeding 3% of the throughput thereby damping the turbulence and preventing the flow from carrying the bacteria out with the flow whereby the bacteria is driven into cake form on the sides of the centrifuge where it remains and subjecting said milk to pasteurizing temperatures whereby a substantial amount of bacteria is removed from said milk by the centrifuging so that the bacteria thereafter remaining may be pasteurized effectively.

2. The method of pasteurizing and eliminating bacteria from a liquid comprising feeding a continuous flow of liquid through a centrifugal rotor, rotating said rotor at a speed to subject said liquid to a centrifugal force between 8,000 and 10,000 *g*, bleeding the centrifugal rotating mass radially of its direction of rotation at a rate not exceeding 3% of the throughput thereby damping the turbulence and preventing the flow from carrying the bacteria out with the flow whereby the bacteria is driven into cake form on the sides of the centrifuge where it remains and subjecting said liquid to pasteurizing temperatures whereby a substantial amount of bacteria is removed from said liquid by the centrifuging so that the bacteria thereafter remaining may be pasteurized effectively.

3. The method of eliminating bacteria from a liquid comprising feeding a continuous flow of liquid through a centrifugal rotor, rotating said rotor at a speed to subject said liquid to a centrifugal force between 8,000 and 10,000 *g*, bleeding the centrifugal rotating mass radially of its direction of rotation at a rate not exceeding 3% of the throughput thereby damping the turbulence and preventing the flow from carrying the bacteria out with the flow whereby the bacteria is driven into cake form on the sides of the centrifuge whereby a substantial amount of bacteria is removed from said liquid.

References Cited in the file of this patent

UNITED STATES PATENTS

| | | |
|---|---|---|
| 1,504,197 | Davis | Aug. 5, 1924 |
| 2,526,292 | Staaf | Oct. 17, 1950 |

FOREIGN PATENTS

| | | |
|---|---|---|
| 714,065 | Great Britain | Aug. 25, 1954 |

OTHER REFERENCES

Monrad: Pasteurization and Milk Preservation, 2nd edition, Winnetka, Ill., 1901, pp. 99–212.